US006465078B1

(12) United States Patent
Kawai et al.

(10) Patent No.: US 6,465,078 B1
(45) Date of Patent: Oct. 15, 2002

(54) RECORDING SHEET WITH AN INK ABSORBING LAYER

(75) Inventors: Ken-ichi Kawai, Himeji; Kiyoharu Mizumoto, Aioi; Akihiro Izuka, Himeji; Takaaki Fujiwa, Himeji; Kiyotaka Inokami, Himeji, all of (JP)

(73) Assignee: Daicel Chemical Industries, Ltd., Osaka (JP)

(*) Notice: Subject to any disclaimer, the term of this patent is extended or adjusted under 35 U.S.C. 154(b) by 0 days.

(21) Appl. No.: 09/125,601

(22) PCT Filed: Dec. 8, 1997

(86) PCT No.: PCT/JP97/04487

§ 371 (c)(1), (2), (4) Date: Aug. 21, 1998

(87) PCT Pub. No.: WO98/32612

PCT Pub. Date: Jul. 30, 1998

(30) Foreign Application Priority Data

Jan. 23, 1997 (JP) ............................................ 9-010530

(51) Int. Cl.[7] ................................................ B32B 3/00
(52) U.S. Cl. ....................................... 428/195; 428/500
(58) Field of Search ................................ 428/195, 500, 428/522

(56) References Cited

U.S. PATENT DOCUMENTS 4,554,181 A * 11/1985 Cousin et al. .............. 427/261
5,861,194 A * 1/1999 Noguchi et al. ............ 427/386

FOREIGN PATENT DOCUMENTS

| | | | | |
|---|---|---|---|---|
| EP | 0802245 A1 | | 10/1997 | |
| EP | 0819546 A1 | | 1/1998 | |
| EP | 0889080 A1 | | 1/1999 | |
| JP | A57-36692 | | 2/1982 | |
| JP | A61-125878 | | 6/1986 | |
| JP | A62-83178 | | 4/1987 | |
| JP | A63-115780 | | 5/1988 | |
| JP | A1-174484 | | 7/1989 | |
| JP | 03-082589 | * | 4/1991 | ............. B32B/7/02 |
| JP | A5-278322 | | 10/1993 | |
| JP | A6-502358 | | 3/1994 | |
| JP | A6-227114 | | 8/1994 | |
| JP | A7-61113 | | 3/1995 | |
| JP | A8-244333 | | 9/1996 | |
| JP | A9-3336 | | 1/1997 | |
| WO | 9207722 | | 5/1992 | |

* cited by examiner

*Primary Examiner*—Bruce H. Hess
*Assistant Examiner*—Michael E Grendzynski
(74) *Attorney, Agent, or Firm*—Birch, Stewart, Kolasch & Birch, LLP

(57) ABSTRACT

A recording sheet is provided by forming, on at least one side of a substrate sheet, an ink absorbing layer comprising a cationic polymer having at least crosslinking groups. The ink absorbing layer may comprise (1) a cationic polymer containing a crosslinking monomer (e.g. a monomer having a hydrolyzable condensing group such as alkoxysilyl) as a comonomer unit, (2) a cationic polymer containing a crosslinking monomer and a hydrophilic monomer (e.g. a monomer having a polyoxyalkylene unit) as comonomer units, or (3) the above cationic polymers (1) and (2), and a hydrophilic polymer. The cationic polymer and the hydrophilic polymer may have interacting reactive groups. This recording sheet is useful for the improvement of the water resistance and ink absorption in an ink jet recording sheet.

15 Claims, No Drawings

RECORDING SHEET WITH AN INK ABSORBING LAYER

This application is the national phase under 35 U.S.C. §371 of prior PCT International Application No. PCT/JP97/04487 which has an International filing date of Dec. 8, 1997 which designated the United States of America, the entire contents of which are hereby incorporated by reference.

TECHNICAL FIELD

The present invention relates to a recording sheet and a method for its manufacture and more particularly to recording sheet which is excellent in ink absorption and water-resistance and, hence, of use in an ink jet recording system and a method for its manufacture.

BACKGROUND ART

The ink jet recording system is rapidly prevailing these days, because the system is well adaptable to full-color image reproduction, less noisy, and superior in the quality of prints. From the standpoint of safety and recordability, water-based inks are mostly employed for ink jet recording in which droplets of an ink are ejected from a nozzle against a recording sheet for image recording. Therefore, the recording sheet is required to absorb the ink quickly. Thus, when a recording sheet of low ink absorption is used, the ink remains long on the surface of the recording sheet after completion of recording so that the record is easily smeared on contact with the equipment, with the operator, or with recorded sheets piled on one another. Moreover, in the high-density image area, the ink supplied in a large quantity is not well absorbed but flows out to cause a blurred image.

Japanese Patent Application Laid-open No.36692/1982 (JP-A-57-36692) discloses an ink jet recording sheet coated with a basic latex polymer for improved water resistance and better image resolution. It is mentioned in this literature that a water-soluble polymer and a pigment, among others, can be incorporated. Japanese Patent Application Laid-open No. 115780/1988 (JP-A-63-115780) discloses an ink jet recording sheet comprising a support and a coating layer composed of a quaternary ammonium salt-containing polymer and teaches the concomitant use of synthetic silica and, as a binder, polyvinyl alcohol or the like. Japanese Patent Application Laid-open No. 61113/1995 (JP-A-7-61113) discloses an ink jet recording medium having an ink receiving layer composed of a polyvinylacetal resin and a cationic compound. Japanese Patent Application Laid-open No. 227114/1994 (JP-A-6-227114) discloses an ink jet recording sheet having an ink receiving layer composed of a pigment, such as microfine silica powder and an ampho-ion or zwitterion latex.

In these recording sheets, ink fixation and water resistance have been improved in certain degrees. However, a conflicting relation holds between ink fixation/water resistance and ink absorption. Namely, any improvement in water resistance is inevitably accompanied by a decrease in ink absorption. Thus, high water resistance and high ink absorption can hardly be reconciled at the same time.

Japanese Patent Application Laid-open No. 174484/1989 (JP-A-1-174484) discloses an ink jet recording sheet comprising a substrate sheet and, as disposed thereon, a coating layer comprising a pigment and a copolymer of a fatty acid vinyl ester, e.g. vinyl acetate, with a cationic monomer. This literature also teaches that the cationic copolymer may be a copolymer containing a nonionic monomer unit or a polyvinyl alcohol graft copolymer, and may further contain a water-soluble polymer binder. Japanese Patent Application Laid-open No. 83178/1987 (JP-A-62-83178) proposes an ink jet recording sheet having a coating layer comprising finely divided silicic acid and a cationic polymer emulsion. This literature further mentions that it is preferable to use a self-crosslinkable acrylic emulsion having a glass transition temperature of not higher than 0° C. as an adhesive.

These recording sheets feature improved water resistance. However, the attained water resistance is not high enough so that when the sheet comes into contact with waterdrops, for instance, the character or picture image bleeds out and, in extreme cases, disappears locally to drastically reduce the quality of the record. Thus, it is difficult to improve water resistance and ink absorption in sufficient measures while insuring an improved quality of the print at the same time.

It is, therefore, an object of the present invention to provide a recording sheet greatly improved in both water resistance and ink absorption and a method of producing the recording sheet.

It is another object of the invention to provide a recording sheet by which the two conflicting characteristics of water resistance and ink absorption are reconciled with each other and a method of producing the same sheet.

DISCLOSURE OF THE INVENTION

The inventors of the present invention did much research for accomplishing the above objects and discovered that the combined use of a cationic polymer having at least crosslinking or crosslinkable groups and a hydrophilic polymer (macromolecular compound) results in improvements in water resistance and ink absorption and that the combined use of a cationic polymer and a hydrophilic polymer (macromolecular compound) which are mutually reactive leads to still greater improvements in both water resistance and ink absorption. The present invention has been developed on the basis of the above findings.

The recording sheet according to the present invention, therefore, comprises a substrate (support sheet) and, as disposed on at least one side thereof, an ink absorbing layer made of a cationic polymer having crosslinking or crosslinkable groups and a hydrophilic polymer (macromolecular compound). In this recording sheet, the cationic polymer may comprise an acrylic polymer emulsion. The cationic polymer can comprise (1) a copolymer of a cationic monomer and a crosslinking monomer or (2) a copolymer of a cationic monomer, a crosslinking monomer, and a hydrophilic monomer. The crosslinking monomer may have hydrolyzable condensing groups (hydrolytically condensing groups) such as alkoxysilyl groups. The hydrophilic monomer may have a polyoxyalkylene unit. The recording sheet of the present invention may be a recording sheet comprising a substrate (support sheet) and, as disposed on at least one side thereof, an ink absorbing layer comprising a cationic polymer containing at least a crosslinking monomer as a comonomer unit, for example (1) a cationic polymer containing a crosslinking monomer as a comonomer unit or (2) a cationic polymer comprising a crosslinking monomer and a hydrophilic monomer as comonomer units.

The present invention is further directed to a method of producing a recording sheet which comprises forming an ink absorbing layer comprising a cationic polymer containing crosslinking groups and a hydrophilic polymer on at least one side of a substrate or support.

The term "hydrophilic polymer" is used in this specification to mean any of various high molecular weight substances (macromolecular compounds) having an affinity for water, thus including water-absorbing polymers and water-soluble polymers.

BEST MODE FOR CARRYING OUT THE INVENTION

The recording sheet of the present invention comprises a substrate or support and an ink absorbing layer, and the ink absorbing layer comprises at least a cationic polymer having crosslinking or crosslinkable groups. This recording sheet is of great value as a recording sheet for ink jet recording in which flying droplets of ink are used to form a record.

[Substrate]

The substrate may be opaque, translucent, or transparent depending on the intended application. For the use as an overhead projector (OHP), the substrate is usually transparent.

There is no particular limitation on the kind of substrate. Thus, the substrate or support includes but is not limited to paper, coated paper, nonwoven cloth, and plastic film. Plastic film is preferred among these substrates.

As the polymers for constituting the plastic film, there may be mentioned polyolefins such as polyethylene and polypropylene, ethylene-vinyl acetate copolymer, polyvinyl chloride, vinyl chloride-vinyl acetate copolymer, poly(meth) acrylic acid esters, polystyrene, polyvinyl alcohol, ethylene-vinyl alcohol copolymer, cellulose derivatives such as cellulose acetate, polyesters (e.g. polyalkylene terephthalates such as polyethylene terephthalate and polybutylene terephthlate, polyalkylene naphthalates such as polyethylene naphthalate and polybutylene naphthalate), polycarbonates, polyamides (e.g. polyamide 6, polyamide 6/6, polyamide 6/10, polyamide 6/12), polyesteramides, polyethers, polyimides, polyamideimides, and polyetheresters. Furthermore, the corresponding copolymers, blends, and crosslinked polymers can be employed.

Among the above-mentioned films, polyolefin (particularly polypropylene), polyester (particularly polyethylene terephthalate, etc.), and polyamide films are generally employed. From the standpoint of mechanical strength and processability, polyesters (particularly polyethylene terephthalate) are preferred.

The thickness of the support can be liberally selected according to the intended application, and is generally about 5 to 250 $\mu$m and preferably about 10 to 200 $\mu$m. The thickness of the film for OHP use may, for example, be about 50 to 200 $\mu$m.

Where necessary, the conventional additives such as antioxidants, ultraviolet absorbers, heat stabilizers, lubricants, pigments, etc. can be incorporated in the plastic film. Moreover, the film may be subjected to a surface treatment such as corona discharge treatment or undercoat treatment, for enhanced adhesion to the ink absorbing layer.

[Ink Absorbing Layer]

An ink absorbing layer at least comprising the cationic polymer is constructed on at least one side of the substrate. The preferred ink absorbing layer can be formed from a cationic polymer and a hydrophilic polymer. The ink absorbing layer of the recording sheet according to the prevent invention may be constructed without any use of the hydrophilic polymer, but instead using a cationic polymer containing at least a crosslinking monomer selected from crosslinking monomers and hydrophilic monomers, as a comonomer unit or units, namely (1) a cationic polymer containing a crosslinking monomer as a comonomer unit or (2) a cationic polymer containing a crosslinking monomer and a hydrophilic monomer as comonomer units. Even such a recording sheet shows high water resistance and ink absorption.

The cationic polymer mentioned above has at least crosslinking groups. The crosslinking group-containing cationic polymer may be (1) a polymer which comprises a monomer composition containing at least a cationic monomer and a crosslinking monomer, or (2) a polymer which comprises a monomer composition containing at least a cationic monomer, a crosslinking monomer, and a hydrophilic monomer. The preferred cationic polymer comprises the above-mentioned polymer (2).

The cationic monomer includes not only a variety of monomers each having a tertiary amino group or a salt thereof, but also a variety of monomers each having, or capable of forming, a quaternary ammonium base or ammonium hydroxide.

The cationic monomer thus includes, for example, di-$C_{1-4}$ alkylamino-$C_{2-3}$ alkyl(meth)acrylamides and salts thereof [dimethylaminoethyl(meth)acrylamide, diethylaminoethyl (meth)acrylamide, dimethylaminopropyl(meth)acrylamide, diethylaminopropyl (meth) acrylamide, etc. and their salts], di-$C_{1-4}$ alkylamino-$C_{2-3}$ alkyl (meth)acrylates and salts thereof [[dimethylaminoethyl (meth)acrylate, diethylaminoethyl (meth)acrylate, dimethylaminopropyl (meth)acrylate, diethylaminopropyl (meth)acrylate, etc. and their salts], di-$C_{1-4}$ alkylamino-$C_{2-3}$ alkyl-substituted aromatic vinyl compounds and salts thereof [4-(2-dimethylaminoethyl) styrene, 4-(2-dimethylaminopropyl) styrene, etc. and their salts], and nitrogen-containing heterocyclic monomers and salts thereof [vinylpyridine, vinylimidazole, vinylpyrrolidone, etc. and their salts]. The salts mentioned above include salts with hydrohalogenic acid (hydrochloride, hydrobromide, etc.), sulfates, alkylsulfates (methylsulfate, ethylsulfate, etc.), alkylsulfonates, arylsulfonates, and carboxylates (acetate ,etc.). It should be understood that an alkylating agent (epichlorohydrin, methyl chloride, benzyl chloride, etc.) can be permitted to act upon the tertiary amino group to form a quaternary ammonium base.

The crosslinking monomer includes various self-crosslinking monomers (self-crosslinkable monomers) and monomers having reactive functional groups, such as epoxy group-containing monomers [glycidyl (meth)acrylate, (meth)allyl glycidyl ether, 1-allyloxy-3,4-epoxybutane, 1-(3-butenyloxy)-2,3-epoxypropane, 4-vinyl-1-cyclohexene-1,2-epoxide, etc.], methylol group-containing monomers and derivatives thereof [N-methylol(meth) acrylamide, N-$C_{1-4}$ alkoxymethyl(meth)acrylamide such as N-methoxymethyl(meth)acrylamide, N-butylol (meth) acrylamide, etc.], silyl or other hydrolyzable condensing group-containing monomers [vinyltrimethoxysilane, vinyltriethoxysilane, vinyltributoxysilane, vinylmethoxydimethylsilane, vinylethoxydimethylsilane, vinylisobutoxydimethylsilane, vinyldimethoxymethylsilane, vinyldiethoxymethylsilane, vinyltris ($\beta$-methoxyethoxy) silane, vinyldiphenylethoxysilane, vinyltriphenoxysilane, $\gamma$-(vinylphenylaminopropyl)trimethoxysilane, $\gamma$-(vinylbenzylaminopropyl) trimethoxysilane, $\gamma$-(vinylphenylaminopropyl)triethoxysilane, $\gamma$-(vinylbenzylaminopropyl)triethoxysilane, divinyldimethoxysilane, divinyldiethoxysilane, divinyldi($\beta$-methoxyethoxy)silane, vinyldiacetoxymethylsilane, vinyltriacetoxysilane, vinylbis(dimethylamino) methylsilane, vinylmethyldichlorosilane, vinyldimethylchlorosilane, vinyltrichlorosilane, vinylmethylphenylchlorosilane, allyltriethoxysilane, 3-allylaminopropyltrimethoxysilane, allyldiacetoxymethylsilane, allyltriacetoxysilane, allylbis (dimethylamino)methylsilane, allylmethyldichlorosilane, allyldimethylchlorosilane, allyltrichlorosilane, methallylphenyldichlorosilane, β-(meth)acryloxyethyltrimethoxysilane, β-(meth)acryloxyethyltriethoxysilane, γ-(meth)acryloxypropyltrimethoxysilane, γ-(meth)acryloxypropyltriethoxysilane, γ-(meth)acryloxypropylmethyldimethoxysilane, γ-(meth)acryloxypropylmethyldichlorosilane, γ-(meth)acryloxypropyltris(β-methoxyethoxy)silane, etc.] and aziridinyl group-containing monomers [2-(1-aziridinyl)ethyl (meth)acrylate, 2-(1-aziridinyl)propyl (meth)acrylate, 3-(1-aziridinyl)propyl (meth)acrylate, etc.]. Those crosslinking monomers can be used independently or in a combination of two or more species.

The preferred crosslinking monomer includes those having a hydrolyzable condensing group, particularly alkoxysilyl ($C_{1-4}$ alkoxysilyl group such as methoxysilyl and ethoxysilyl).

The hydrophilic monomer includes but is not limited to carboxyl group-containing monomers [monomers having free carboxyl groups or acid anhydride groups such as (meth)acrylic acid, itaconic acid, maleic acid, maleic anhydride, fumaric acid and crotonic acid, and the corresponding salts (alkali metal salts, alkaline earth metal salts, ammonium salts, amine salts, etc.)], half-esters of unsaturated polycarboxylic acids or acid anhydrides thereof with a straight-chain or branched alcohol containing 1 to about 20 carbon atoms [monomethyl maleate, monoethyl maleate, monobutyl maleate, monooctyl maleate, mono-2-ethylhexyl maleate, etc.], hydroxyl group-containing monomers [hydroxy-$C_{2-6}$ alkyl esters of (meth)acrylic acid including 2-hydroxyethyl (meth)acrylate, 2-hydroxypropyl (meth)acrylate, 3-hydroxypropyl (meth)acrylate and 4-hydroxybutyl (meth)acrylate, etc.], amide group-containing monomers [(meth)acrylamide, α-ethyl(meth)acrylamide, N-methyl(meth)acrylamide, N-butoxymethyl (meth)acrylamide, diacetone(meth)acrylamide, etc.], sulfo-containing monomers [styrenesulfonic acid, vinylsulfonic acid, etc.], ether group-containing monomers [vinyl ethers such as vinyl methyl ether, vinyl ethyl ether and vinyl isobutyl ether], and polyoxyalkylene group-containing monomers [diethylene glycol mono(meth)acrylate, triethylene glycol mono(meth)acrylate, polyethylene glycol mono (meth)acrylate, etc.]. These hydrophilic monomers may also be used independently or in a combination of two or more species.

The preferred hydrophilic monomer includes carboxyl group-containing monomers [(meth)acrylic acid, etc.], hydroxyl group-containing monomers [2-hydroxyethyl (meth)acrylate, hydroxypropyl (meth)acrylate, etc.], and monomers containing a polyoxyalkylene unit [diethylene glycol mono(meth)acrylate, triethylene glycol mono(meth) acrylate, polyethylene glycol mono(meth)acrylate, etc.].

These monomers are generally used in combination with one or more nonionic monomers for judicious control of film-forming properties and film characteristics.

The nonionic monomer that can be used includes, for example, alkyl esters [e.g. $C_{1-18}$ alkyl esters of (meth) acrylic-acid such as methyl (meth)acrylate, ethyl (meth) acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate and stearyl (meth)acrylate], cycloalkyl esters [cyclohexyl (meth) acrylate, etc.], aryl esters [phenyl (meth)acrylate, etc.], aralkyl esters [benzyl (meth)acrylate, etc.], aromatic vinyl compounds [styrene, vinyltoluene, α-methylstyrene, etc.], vinyl esters [vinyl acetate, vinyl propionate, vinyl versatate, etc.], allyl esters [allyl acetate, etc.], halogen-containing monomers [vinylidene chloride, vinyl chloride, etc.], vinyl cyanides [(meth)acrylonitrile, etc.], olefins [ethylene, propylene, etc.], and the like.

These nonionic monomers can also be used independently or in a combination of two or more species.

As the nonionic monomer, use can be generally made of $C_{1-18}$ alkyl esters of (meth)acrylic acid [particularly $C_{2-10}$ alkyl esters of acrylic acid and $C_{1-6}$ alkyl esters of methacrylic acid], aromatic vinyl compounds [particularly styrene], and vinyl esters [particularly vinyl acetate].

The proportions of the cationic monomer, crosslinking monomer, and hydrophilic monomer can be judiciously selected from the range not detracting from water resistance and ink absorption. By way of illustration, the cationic monomer may account for about 0.1 to 50 mole % (e.g. 1 to 45 mole %), preferably about 0.5 to 40 mole % (e.g. 2 to 35 mole %), more preferably about 1 to 30 mole % (e.g. 3 to 25 mole %), and usually about 2 to 25 mole %, of the total monomer component. The crosslinking monomer may account for about 0.1 to 25 mole %, preferably about 0.2 to 20 mole %, more preferably about 0.5 to 15 mole %, and usually about 0.3 to 10 mole %, of the total monomer component.

The proportion of the hydrophilic monomer may for example be about 0 to 50 mole %, preferably about 0 to 45 mole % (0.5 to 45 mole %), more preferably about 0 to 40 mole % (1 to 35 mole %), and generally about 1 to 20 mole % of the total monomer component. Usually, the nonionic monomer mentioned above accounts for the remainder of the total monomer component.

The glass transition temperature of the cationic monomer can be selected from the range not adversely affecting film-forming and other characteristics, and may for example be about −20° C. to 50° C., preferably about −10° C. to 40° C., and more preferably about 0° C. to 30° C. Polymers with such glass transition temperatures can be produced by using appropriate species of the cationic monomer and crosslinking monomer, plus, optionally, the hydrophilic monomer, in a suitable combination. Those monomers may be practically copolymerized with a hard monomer [e.g. a monomer which will give a homopolymer with a glass transition temperature of about 80 to 120° C. (particularly 90 to 105° C.), such as methyl (meth)acrylate and styrene] and a soft monomer [e.g. a monomer which will give a homopolymer with a glass transition temperature of about −85° C. to −10° C. (particularly −85° C. to −20° C.), such as $C_{2-10}$ alkyl ester of acrylic acid] to constitute a copolymer.

In using the respective monomers in combination, their proportions can be selected, for example, from within the following ranges.

(a) Cationic Monomer 1 to 40 weight % (preferably 3 to 35 weight %, particularly 5 to 30 weight %)

(b) Crosslinking Monomer 0.5 to 20 weight % (preferably 1 to 15 weight %, particularly 2 to 10 weight %)

(c) Hydrophilic Monomer 0 to 50 weight % (preferably 2 to 45 weight %, particularly 5 to 40 weight %)

(d) Hard Monomer 10 to 60 weight % (preferably 20 to 55 weight %, particularly 25 to 50 weight %)

(e) Soft Monomer 10 to 60 weight % (preferably 15 to 50 weight %, particularly 20 to 45 weight %)

The weight average molecular weight of the cationic polymer can be selected from the range of, for example, about $0.2\times10^4$ to $100\times10^4$, preferably about $1\times10^4$ to $50\times10^4$.

The form of the cationic polymer may be a solution such as an organic solvent solution or an aqueous solution, but is generally a cationic emulsion (particularly an aqueous emulsion).

The surface potential (ζ potential) of polymer particles in the cationic emulsion may for example be about +10 to +60 mV, preferably about +12 to +55 mV (e.g. +15 to +55 mV), and more preferably about +20 to +55 mV. The lower the surface potential of the polymer particle is, the lower are ink fixability and water resistance, while the higher the surface potential is, the lower is ink absorption.

The surface potential (ζ potential) of polymer particles can be determined, for example, under the following conditions.

Instrument: Electrophoretic light scattering photometer, manufactured by Otsuka Electronics; ELS-800)

Measuring temperature: 25° C.

Concentration: The emulsion is diluted with distilled water to a concentration of 0.01 to 0.05 weight % as nonvolatile matter.

Distance between electrodes: 32 mm

Electric field: 50 V/cm

The average diameter of polymer particles in the cationic emulsion may, for example, be about 1 to 200 nm, preferably about 3 to 100 nm, and more preferably about 5 to 50 nm. The cationic emulsion containing such a cationic polymer can be prepared by the conventional technology including the method in which the above-mentioned monomers are emulsion-polymerized in an emulsion polymerization system containing a nonionic surfactant and/or a cationic surfactant and the method in which, following polymerization of the monomers, the reaction product is converted to a tertiary amine salt or a quaternary ammonium salt to provide the objective aqueous emulsion.

[Hydrophilic Polymer]

When the cationic polymer (preferably a cationic emulsion containing a cationic polymer) and a hydrophilic polymer (a water-soluble polymer or a water-insoluble, water-absorbent polymer) are used in combination to form an ink absorbing layer, enhanced ink absorption can be insured without sacrificing water resistance in any appreciable measure.

The hydrophilic polymer includes but is not limited to hydrophilic naturally-occurring polymers and derivatives thereof (starch, corn starch, sodium alginate, gum arabic, gelatin, casein, dextrin, etc.), cellulose derivatives (methylcellulose, ethylcellulose, hydroxyethylcellulose, carboxymethylcellulose, cellulose sulfate, cyanoethylcellulose, etc.), vinyl alcohol-series polymers (polyvinyl alcohol, ethylene-vinyl alcohol copolymer, etc.), ethylenic polymers (ethylene-maleic anhydride copolymer, etc.), vinyl acetate-series copolymers (e.g. vinyl acetate-methyl acrylate copolymer, etc.), polyalkylene oxides (polyethylene oxide, ethylene oxide-propylene oxide block copolymer, etc.), carboxyl- or sulfo-containing polymers and salts thereof [acrylic polymers (poly (meth)acrylic acid or its salt (ammonium salt and alkali metal salts such as sodium salt), methyl methacrylate-(meth)acrylic acid copolymer, acrylic acid-polyvinyl alcohol copolymer, etc.), vinyl ether-series polymers (poly(vinyl alkyl ethers) such as poly(vinyl methyl ether) and poly(vinyl isobutyl ether), methyl vinyl ether-maleic anhydride copolymer, etc.), styrenic polymers (styrene-maleic anhydride copolymer, styrene-(meth)acrylic acid copolymer, poly(sodium styrenesulfonate), etc.), poly(sodium vinylsulfonate), etc.], nitrogen-containing polymers (or cationic polymers) and salts thereof (quaternary ammonium salts such as polyvinylbenzyltrimethylammonium chloride, polydiallyldimethylammonium chloride, etc., polydimethylaminoethyl (meth)acrylate hydrochloride, polyvinylpyridine, polyvinylimidazole, polyethyleneimine, polyamidepolyamine, polyacrylamide and polyvinylpyrrolidone, etc.), among others. These hydrophilic polymers can be used independently or in combination.

Among these hydrophilic polymers, those preferred are cellulose derivatives (particularly hydroxyethylcellulose, etc.), vinyl alcohol-series polymers (particularly polyvinyl alcohol, etc.), vinyl ester-series polymers (particularly vinyl acetate-series copolymers, etc.), polyvinylpyrrolidone, and the like.

Also preferred are hydrophilic polymers each having at least one functional group selected from the group consisting of the polyoxyalkylene unit, acetoacetyl group, carboxyl group, acid anhydride group, and amino group.

The above-mentioned vinyl ester-series polymers (e.g. vinyl acetate-series copolymers) are copolymers of vinyl esters (e.g. vinyl acetate) with another species of copolymerizable monomer and include partial hydrolyzates of such copolymers (e.g. partial hydrolyzates with degrees of saponification of about 10 to 90%). The preferred copolymerizable monomer includes hydrophilic monomers having hydrophilic groups (e.g. carboxyl and sulfo, inclusive of their salts, hydroxyl, ether, etc.). Particularly, use can be made of vinyl monomers having ether groups, particularly oxyalkylene units, in which the number of alkylene oxide units (number of moles added) is 1 to about 100, preferably about 2 to 80 (e.g. 5 to 80), and more preferably about 5 to 70 (e.g. 10 to 50), specific examples of which are (meth) acrylic acid esters and allyl ethers.

The vinyl monomers having oxyalkylene units include but are not limited to diethylene glycol mono (meth) acrylate, triethylene glycol mono(meth)acrylate, polyethylene glycol mono(meth)acrylate, dipropylene glycol mono (meth)acrylate, tripropylene glycol mono(meth)acrylate, polypropylene glycol mono(meth)acrylate, diethylene glycol mono(meth)allyl ether, triethylene glycol mono(meth) allyl ether, polyethylene glycol mono(meth)allyl ether, dipropylene glycol mono(meth)allyl ether, tripropylene glycol mono( meth)allyl ether, and polypropylene glycol mono (meth)allyl ether. Those vinyl monomers can be used independently or in a combination of two or more species. The preferred monomers are (meth) acrylates which are vinyl monomers containing oxyethylene units as oxyalkylene unit, and particularly polyoxyalkylene (meth) allyl ethers (above all, polyoxyethylene allyl ether).

In the vinyl acetate-series copolymer, the proportion of the copolymerizable monomer can be selected from the range not adversely affecting image definition (image sharpness) and water resistance, and may for example be about 0.1 to 50 mole %, preferably about 1 to 30 mole %, and more preferably about 2.5 to 25 mole % (e.g. 3 to 20 mole %) of the total monomer component.

The copolymer of vinyl acetate with a vinyl monomer having a polyoxyalkylene unit (modified vinyl acetate-series resin) is commercially available under the name of OKS-7158G, product of Nippon Synthetic Chemical Industry, Co., Ltd., to give an example.

The preferred hydrophilic polymer further includes hydrophilic polymers having functional groups reactive to the reactive functional groups (e.g. epoxy groups such as glycidyl group, alkoxysilyl groups) of the cationic polymer. Such hydrophilic polymers can be used, for example, in the following combinations according to the species of the reactive groups (particularly crosslinking groups) possessed by the cationic polymers.

(1) Cationic polymer: epoxy group such as glycidyl

Hydrophilic polymer: carboxyl group, acid anhydride, amino groups (2) Cationic polymer: methylol group Hydrophilic polymer: hydroxyl, carboxyl, acid anhydride groups (3) Cationic polymer: hydrolyzable condensing group such as alkoxysilane Hydrophilic polymer: hydroxyl, carboxyl groups (4) Cationic polymer: aziridinyl group Hydrophilic polymer: hydroxyl, carboxyl, amino groups In such combinations, the cationic polymer and the hydrophilic polymer bond to or crosslink with each other to form a highly water-resistant ink absorbing layer with high ink absorption.

The preferred hydrophilic polymer reactive with the cationic polymer includes hydrophilic polymers which are self-crosslinking (cross-linkable) and contain functional groups reactive with reactive functional groups of the cationic polymer, such as the following hydrophilic polymers.

1. Acetoacetyl-modified Hydrophilic Polymers

The acetoacetyl-modified hydrophilic polymer includes acetoacetyl-containing hydrophilic polymers obtained by a reaction of hydroxyl-containing hydrophilic polymer with an acetoacetic acid ester, such as acetoacetyl-modified vinyl acetate-series copolymers (acetoacetyl-containing polyvinyl alcohol, acetoacetyl-containing cellulose derivatives, etc.). Acetoacetyl-modified vinyl acetate-series copolymers can be purchased from commercial sources such as Nippon Synthetic Chemical Industry, Co., Ltd.

2. Carboxyl-modified Hydrophilic Polymers (2a) Carboxyl-modified polyvinyl alcohols: e.g. partial hydrolyzates of the copolymers of vinyl esters (vinyl acetate, vinyl propionate, vinyl formate, etc.) with a carboxyl-containing unsaturated monomer (a monocarboxylic acid such as (meth)acrylic acid, a dicarboxylic acid such as maleic acid, fumaric acid and itaconic acid, or an acid anhydride or alkyl monoester thereof, etc.). Such carboxyl-modified polyvinyl alcohols can be purchased from commercial sources such as Kuraray Co., Ltd.

The carboxyl-modified hydrophilic polymer further includes styrene-(meth)acrylic acid copolymer, (meth) acrylic acid ester-(meth)acrylic acid copolymer (e.g. methyl methacrylate-(meth)acrylic acid copolymer), vinyl acetate-(meth)acrylic acid copolymer, and the like.

(2b) Carboxyl-containing polysaccharides such as carboxy $C_{1-4}$ alkylcellulose, carboxymethyldextran, and alginic acid.

3. Acid Anhydride Group-containing Hydrophilic Polymer

Alkyl vinyl ether-maleic anhydride copolymers (e.g. methyl vinyl ether-maleic anhydride copolymer), ethylene-maleic anhydride copolymer, vinyl acetate-maleic anhydride copolymer, styrene-maleic anhydride copolymer, and (meth) acrylic acid ester-maleic anhydride copolymer (e.g. methyl methacrylate-maleic anhydride copolymer).

4. Amino-containing Hydrophilic Polymer

Polyamidepolyamines, polyvinylamines, poly(N-vinylformamide) partial hydrolyzate, amino-containing polysaccharides (aminodextran, chitosan, etc.), etc.

The ratio of the cationic polymer to the hydrophilic polymer can be selected, according to the species of cationic polymer and hydrophilic polymer and the concentration of the available crosslinking groups, from the range not detracting from water resistance and ink absorption. For example, the ratio (former/latter) can be selected from the range of about 5/95 to 95/5 (weight %), preferably about 10/90 to 90/10 (weight %), and more preferably about 20/80 to 80/20 (weight %), on anonvolatile matter basis. The ratio is usually about 10/90 to 50/50 (weight %), and particularly about 20/80 to 40/60 (weight %).

The hydrophilic polymer may have reactive functional groups of the cationic polymer. In such cases, the cationic polymer may have functional groups corresponding to the functional groups of the hydrophilic polymer. For example, when the hydrophilic polymer is an epoxy-containing polymer, the cationic polymer may have a carboxyl or amino group. The epoxy-containing polymer includes but is not limited to hydrolyzates of the copolymers of an epoxy-containing monomer (glycidyl (meth)acrylate, allyl glycidyl ether, etc.) with vinyl esters (vinyl acetate, etc.), epoxy-containing polyvinyl alcohols in which the epoxy group is obtained by a reaction of active hydrogen (hydroxy, amino, carboxy, etc.)-containing hydrophilic polymers with epichlorohydrin, and epoxy-containing polyvinylpyrrolidones obtainable by copolymerizing the epoxy-containing monomers with vinylpyrrolidone. The epoxy content is about 0.01 to 5 mole %, preferably about 0.1 to 3 mole % (e.g. 0.2 to 2.5 mole %), and particularly about 0.2 to 2 mole %, based on the total monomer component.

A curing agent (a curing catalyst or a cure accelerator) may be added to the ink absorbing layer for the promotion of the curing reaction. The curing agent that can be used includes, for example, organotin compounds (dibutyltin dilaurate, dibutyltin dimaleate, dioctyltin dilaurate, dioctyltin dimaleate, dibutyltin diacetate, dibutyltin dimethoxide, tributyltin sulfite, dibutyltin thioglycolate, stannous octanoate, etc.), organoaluminum compounds (aluminum isopropylate, aluminum tris(ethylacetoacetate), aluminum tris(acetylacetonate), ethyl acetoacetate aluminum diisopropylate, etc.), organotitanium compounds (isopropyl trisstearoyl titanate, tetraisopropyl bis(dioctyl phosphate) titanate, bis(dioctyl pyrophosphate) oxyacetate titanate, etc.), organozirconium compounds (tetra-n-butoxyzirconium, zirconyl octanoate, reaction products of alkoxyzirconiums with acetylacetone or an acetoacetic ester, etc.), acidic compounds (organic acids such as aliphatic organic carboxylic acids, e.g. acetic acid, propionic acid, hydroxycarboxylic acids, aromatic carboxylic acids, e.g. benzoic acid, sulfonic acids, e.g. benzenesulfonic acid, p-toluenesulfonic acid, dodecylbenzenesulfonic acid, etc.), basic compounds (bases, for exmple, organic bases including triethylamine, and inorganic bases including sodium hydroxide and potassium hydroxide), acidic phosphoric acid esters (monobutyl phosphate, dibutyl phosphate, isopropyl acid phosphate, butyl acid phosphate, octyl acid phosphate, tridecyl acid phosphate, etc.), and mixtures or reaction products of the acidic phosphoric acid esters with an amine (hexylamine, triethylamine, N,N-dimethyldodecylamine, 3-propanolamine, etc.). Those curing agents can be used singly or as a mixture of two or more species.

The amount of the curing agent can be selected from the range conducive to acceleration of hardening, for example, from the range of about 0.01 to 10 weight parts, preferably about 0.1 to 5 weight parts, per 100 weight parts of the resin composition comprising the cationic polymer and the hydrophilic polymer on a nonvolatile matter basis.

For improved fixation of colorants (dyes), it is advantageous to use a dye fixing agent (dye fixative), particularly a macromolecular dye fixing agent or high molecular weight dye fixative. Dye fixatives (high molecular weight dye fixatives) usually contain cationic groups (particularly strongly cationic groups such as guanidyl or quaternary ammonium salt groups) in the molecule. The dye fixative may be soluble in water.

The dye fixative thus includes but is not limited to dicyan-series fixatives (dicyandiamide-formaldehyde polycondensate, etc.), polyamine-series fixatives [aliphatic polyamines such as diethylenetriamine, triethylenetetramine, dipropylenetriamine and polyallylamine, aromatic polyamines such as phenylenediamine, dicyandiamide-(poly)$C_{2-4}$ alkylenepolyamine condensates (dicyandiamide-diethylenetriamine polycondensate, etc.)], and polycation-series fixatives. The polycation-series fixative includes but is not limited to epichlorohydrin-di-$C_{1-4}$ alkylamine addition polymers (epichlorohydrin-dimethylamine addition polymer, etc.), polymers of allylamine or its salt (a polymer of polyallylamine or its hydrochloride such as PAA-10C, PAA-HCl-3L, PAA-HCl-10L, etc., all available from Nitto Boseki Co., Ltd.), polymers of diallyl-$C_{1-4}$ alkylamine or its salt (e.g. a polymer of diallylmethylamine or its hydrochloride, such as PAS-M-1 available from Nitto Boseki Co., Ltd.), polymers of diallyl-di-$C_{1-4}$ alkylammonium salts (diallyldimethylammonium chloride polymer, e.g. PAS-H-5L, PAS-H-10L, etc. available from Nitto Boseki Co., Ltd.), copolymers of diallylamine or its salt with sulfur dioxide (diallylamine hydrochloride -sulfur dioxide copolymer, e.g. PAS-92 available from Nitto Boseki Co., Ltd.), diallyl $C_{1-4}$ alkylammonium salt-sulfur dioxide copolymers (e.g. diallyldimethylammonium chloride-sulfur dioxide copolymer such as PAS-A-1, PAS-A-5, PAS-A-120L, PAS-A-120A, etc. available from Nitto Boseki Co., Ltd.), copolymers of diallyl-di-$C_{1-4}$ alkylammonium salts with diallylamine or a salt or derivative thereof (e.g. a copolymer of diallyldimethylammonium chloride-diallylamine hydrochloride derivative such as PAS-880 available from Nitto Boseki Co., Ltd.), polymers of diallyl-di-$C_{1-4}$ alkylammonium salts, polymers of di-$C_{1-4}$ alkylaminoethyl(meth)acrylate quaternary salts, diallyl-di-$C_{1-4}$ alkylammonium salt-acrylamide copolymers (diallyldimethylammonium chloride-acrylamide copolymer, such as PAS-J-81 available from Nitto Boseki Co., Ltd.), and amine-carboxylic acid copolymers (e.g. PAS-410 available from Nitto Boseki Co., Ltd.). Those dye fixatives can also be used independently or in a combination of two or more species.

The amount of the dye fixative can be selected from the range conducive to improved fixation, for example the range of about 0.1 to 40 weight parts, preferably about 1 to 30 weight parts, and more preferably about 2 to 20 weight parts, on a nonvolatile matter basis, per 100 weight parts of the resin composition comprising the cationic polymer and the hydrophilic polymer.

Where necessary, the ink absorbing layer may be supplemented with other ingredients, such as a polymer having no crosslinking group or an aqueous emulsion containing polymer particles (e.g. acrylic resin emulsion, ethylene-vinyl acetate copolymer emulsion, vinyl acetate-series emulsion).

A particulate substance (e.g. a pigment) may be incorporated in the ink absorbing layer. The particulate substance includes, for example, inorganic powders (particulate minerals such as white carbon, finely divided calcium silicate, zeolite, magnesium gluminosilicate calcined diatomite, finely divided magnesium carbonate, finely divided alumina, silica, talc, kaolin, delaminated kaolin, clay, heavy calcium carbonate, light calcium carbonate, magnesiumcarbonate, titaniumdioxide, aluminum hydroxide, calcium hydroxide, magnesium hydroxide, magnesium silicate, calcium sulfate, sericite, bentonite, smectite, etc.), and organic powders (organic particles such as finely divided organic powders of crosslinked or non-crosslinked polystyrene, acrylic, urea, melamine, benzoguanamine, and other resins and microfine hollow powders). Those particulate substances can be selectively used independently or in a suitable combination of two or more species. When a particulate substance is used, the hydrophilic polymer mentioned hereinbefore can be used as a binder resin.

The ratio of the particulate substance to the binder resin may, for example, be about 0.1 to 80 weight parts, preferably about 0.2 to 50 parts of the particulate substance relative to 100 weight parts of the binder resin.

The ink absorbing layer may further contain the conventional additives, such as an antifoam, a coatability improving agent, a thickener, a lubricant, a stabilizer (antioxidant, ultraviolet absorber, heat stabilizer, etc.), an antistatic, and an antiblocking agent each in a proportion not adversely affecting the characteristics of the ink absorbing layer.

The thickness of the ink absorbing layer can be selected according to the intended application and may for example be about 5 to 50 $\mu$m, preferably about 10 to 30 $\mu$m, and usually about 5 to 30 $\mu$m.

Being equipped with the above ink absorbing layer, the recording sheet of the present invention features high ink absorption and high ink fixation properties and, at the same time, has been remarkably improved in water resistance. Thus, when a printing or image, formed with a water-based ink by an ink jet recording system and dried, is immersed in water at a temperature of 30° C. for 1 minute, the recording sheet shows a color density retention rate of not less than 80% (e.g. about 85 to 100%), preferably not less than 85% (e.g. about 90 to 99%).

[Production Technology]

The recording sheet of the present invention can be manufactured by constructing, on at least one side of the substrate, (1) an ink absorbing layer comprising the crosslinking group-containing cationic polymer and the hydrophilic polymer, (2) an ink absorbing layer comprising the crosslinking group- and hydrophilic group-containing cationic polymer and the hydrophilic polymer, (3) an ink absorbing layer comprising the crosslinking group-containing cationic polymer, or (4) an ink absorbing layer comprising the crosslinking group- and hydrophilic group-containing cationic polymer.

Any of the above ink absorbing layers can be formed by coating the substrate or support with a coating composition prepared with the use of a suitable solvent (water, a hydrophilic solvent which may be soluble in water, a hydrophobic solvent, or a mixture of these solvents). When the cationic polymer is an aqueous emulsion, a water-based or aqueous coating composition is employed. The coating composition is cast or coated on at least one side of the substrate by roll coating, air knife coating, blade coating, rod coating, bar coating, comma coating, gravure coating, silk screen coating, or other conventional casting or coating techniques.

The ink absorbing layer can be provided by applying a coating composition containing the ingredients to at least one side of the substrate and drying the coating. Where necessary, a crosslinked ink absorbing layer may be provided by heating the coated substrate at a suitable temperature selected form the range of about 50 to 150° C.

Where necessary, a porous layer, an antiblocking layer, a lubrication or slipping layer, or an antistatic layer may be superimposed on the ink absorbing layer.

INDUSTRIAL APPLICABILITY

In accordance with the present invention, the ink absorbing layer is constructed from a cationic polymer containing at least crosslinking groups, whereby water resistance and ink absorption show marked improvements. Moreover, the conflicting parameters of water resistance and ink absorbability are reconciled, while improved print quality are ensured. Therefore, the recording sheet of the present invention is not only valuable as a recording sheet for the ink jet recording system in which flying droplets of ink are used to make a record, but also useful as printing sheets (particularly sheets for water-based inks) for offset printing, flexography or other printing methods.

EXAMPLES

The following examples are intended to illustrate the present invention in further detail and should by no means be construed as defining the scope of the invention.

In the examples, the term "part(s)" indicates part(s) by weight. The various quality parameters of the recording sheets prepared in the examples and comparative examples were determined and evaluated by the following methods.

Using an ink jet printer (BJC-420J, manufactured by Canon, Inc.), a solid record image in each color of cyan, yellow, magenta and black was printed on the recording sheet obtained in the examples and comparative examples.

(Ink Absorption)

At every predetermined period of time after printing, PPC copying paper was set on the printed portion and a load (250 g/$cm^2$) was imposed on the copying paper for 10 seconds. The copying paper was then removed and visually inspected for offset. The ink absorption was evaluated in terms of the time when offset was no longer observed.

(Water Resistance)

After printing, the print was wiped with a water-soaked cotton swab in 10 reciprocations and the degree of deinking (ink removal) was visually evaluated.

○: Unchanged

Δ: Some deinking has made the print pale

×: The print has been wiped out (Print Quality)

The quality of the print was visually evaluated according to the following criteria.

○: Uniform print

Δ: Somewhat uneven print

×: Considerably uneven print (Water Immersion Test)

The printed portion was immersed in water at 30° C. for 1 minute, then raised vertically out of the water, drained well, and dried. After being dried, the print was visually evaluated according to the following criteria.

○: The print remains intact

Δ: The print is blurred

×: No print remained (Color Density Retention)

The color density of the print was measured with the reflectance type Macbeth densitometer RD-1255 (Sakata Inx Corp.). The color density was expressed in the sum of the maximum reflected densities of cyan, yellow, magenta, and black. The printed part was immersed in water at 30° C. for 1 minute, raised vertically from the water, drained well, and dried. After being dried, the color density was similarly determined and the color density retention rate was calculated by means of the following equation.

Color density retention (%)=(color density after immersion/color density before immersion)×100

Example 1

(1) Cationic Acrylic Copolymer Emulsion 1

A 2,000 ml reactor equipped with a stirrer, a reflux condenser, a drip funnel, a nitrogen gas inlet pipe, and a thermometer was charged with 219 parts of isopropyl alcohol (IPA) and 1.23 parts of azoisobutyronitrile (AIBN). The charge was dissolved by stirring and heated to 80° C. As a copolymerization component, a mixture of 93.7 parts of methyl methacrylate (MMA), 98.7 parts of n-butyl acrylate (BA), 49.3 parts of diethylaminoethyl methacrylate (DEAEMA), and 4.93 parts of trimethoxysilanepropyl methacrylate (Nippon Unicar, A-174; hereinafter sometimes referred to briefly as A-174) was fed dropwise into the reactor over about 4 hours. After completion of the dropwise addition, a solution mixture of 0.25 part of AIBN and 25 parts of IPA was further added dropwise as an additional catalyst, and the reaction was continued for another 2 hours to complete the polymerization reaction.

After completion of the polymerization, 16 parts of acetic acid was fed into the flask with constant stirring and, thereafter, 705 parts of water was introduced dropwise over about 2 hours for emulsification. From the resulting emulsion, IPA was evaporated off on a rotary evaporator to provide a cationic acrylic copolymer emulsion 1 (nonvolatile matter 34.7%). The surface potential (ζ potential) of the polymer particles of this emulsion was +23 mV, as determined under the above-described conditions.

(2) Recording Sheet 1A

A water-based coating composition was prepared by mixing 86.5 parts (nonvolatile matter 30 parts) of the cationic acrylic copolymer emulsion 1 obtained in the above step (1) with 700 parts (nonvolatile matter 70 parts) of a 10 weight % aqueous solution of acetoacetyl-modified vinyl acetate-series copolymer (Nippon Synthetic Chemical Industry, Co., Ltd., Z-320).

The above water-based coating composition was coated on a 100 μm-thick polyethylene terephthalate film pretreated for increased bonding affinity (ICI Japan, Mellinex 705; hereinafter sometimes referred to briefly as PET film) and dried at 100° C. for 3 minutes to provide a recording sheet 1A having a 15 μm-thick ink absorbing layer.

(3) Recording Sheet 1B

A water-based coating composition was prepared by mixing 72.0 parts (nonvolatile matter 25 parts) of the cationic acrylic copolymer emulsion 1 obtained in the above step (1) with 500 parts (nonvolatile matter 75 parts) of a 15 weight % aqueous solution of a modified vinyl acetate-series copolymer (Nippon Synthetic Chemical Industry, Co., Ltd., OKS-7158G). This water-based coating composition was coated on a PET film and dried at 100° C. for 3 minutes to provide a recording sheet 1B having a 15 μm-thick ink absorbing layer.

(4) Recording Sheet 1C

A water-based coating composition was prepared by mixing 72.0 parts (nonvolatile matter 25 parts) of the cationic acrylic copolymer emulsion 1 obtained in the above step (1) with 750 parts (nonvolatile matter 75 parts) of a 10 weight % aqueous solution of polyvinylpyrrolidone (weight average molecular weight 36×$10^4$). This water-based coating composition was coated on a PET film and dried at 100° C. for 3 minutes to provide a recording sheet 1C having a 15 μm-thick ink absorbing layer.

(5) Recording Sheet 1D

A water-based coating composition was prepared by mixing 115.3 parts (nonvolatile matter 40 parts) of the cationic acrylic copolymer emulsion 1 obtained in the above step (1), 400 parts (nonvolatile matter 60 parts) of a 15 weight % aqueous solution of a modified vinyl acetate-series copolymer (Nippon Synthetic Chemical Industry, Co., Ltd., OKS-7158G), 4 parts of a curing- or crosslinking-accelerator (paratoluenesulfonic acid), and 0.4 part of a particulate substance (Sekisui Plastics Co., Ltd., crosslinked poly(methyl methacrylate) MBX-20). This water-based coating composition was coated on a PET film and dried at 100° C. for 3 minutes to provide a recording sheet 1D having a 15 μm-thick ink absorbing layer.

(6) Recording Sheet 1E

A water-based coating composition was prepared by mixing 115.3 parts (nonvolatile matter 40 parts) of the cationic acrylic copolymer emulsion 1 obtained in the above step (1), 600 parts (nonvolatile matter 60 parts) of a 10 weight % aqueous solution of an acetoacetyl-modified vinyl acetate-series copolymer (Nippon Synthetic Chemical Industry, Co., Ltd., Z-320), and 35.7 parts (nonvolatile matter 10 parts) of a 28 weight % aqueous solution of a dye fixative (Nitto Boseki Co., Ltd., PAS-H-5L). This water-based coating composition was coated on a PET film and dried at 100° C. for 3 minutes to provide a recording sheet 1E having a 15 μm-thick ink absorbing layer.

Example 2

(1) Cationic Acrylic Copolymer Emulsion 2

Except for using, as copolymerization components, 71.6 parts of MMA, 71.6 parts of BA, 49.3 parts of DEAEMA, 49.3 parts of polyethylene glycol methacrylate (NOF Corporation, Blemmer PEG-200; hereinafter sometimes referred to briefly as PEG-200), and 4.9 parts of "A-174," the procedure of Example 1 was repeated to provide a cationic acrylic copolymer emulsion 2 (nonvolatile matter 31.9%). The surface potential (ζ potential) of the polymer particles of the emulsion was +32 mV, as determined under the conditions mentioned hereinbefore.

(2) Recording Sheet 2A

The cationic acrylic copolymer emulsion 2 obtained in the above step (1) was coated on a PET film and dried at 100° C. for 3 minutes to provide a recording sheet 2A having a 15 μm-thick ink absorbing layer.

(3) Recording Sheet 2B

A water-based coating composition was prepared by mixing 125.4 parts (nonvolatile matter 40 parts) of the cationic acrylic copolymer emulsion 2 obtained in the above step (1) with 600 parts (nonvolatile matter 60 parts) of a 10 weight % aqueous solution of an acetoacetyl-modified vinyl acetate-series copolymer (Nippon Synthetic Chemical Industry, Co., Ltd., Z-320). This water-based coating composition was coated on a PET film and dried at 100° C. for 3 minutes to provide a recording sheet 2B having a 15 μm-thick ink absorbing layer.

(4) Recording sheet 2C

A water-based coating composition was prepared by mixing 78.4 parts (nonvolatile matter 25 parts) of the cationic acrylic copolymer emulsion 2 obtained in the above step (1) with 500 parts (nonvolatile matter 75 parts) of a 15 weight % aqueous solution of a modified vinyl acetate-series copolymer (Nippon Synthetic Chemical Industry, Co., Ltd., OKS-7158G). This water-based coating composition was coated on a PET film and dried at 100° C. for 3 minutes to provide a recording sheet 2C having a 15 μm-thick ink absorbing layer.

(5) Recording sheet 2D

A water-based coating composition was prepared by mixing 156.7 parts (nonvolatile matter 50 parts) of the cationic acrylic copolymer emulsion 2 obtained in the above step (1) with 500 parts (nonvolatile matter 50 parts) of a 10 weight % aqueous solution of polyvinylpyrrolidone (weight average molecular weight $36\times10^4$). This water-based coating composition was coated on a PET film and dried at 100° C. for 3 minutes to provide a recording sheet 2D having a 15 μm-thick ink absorbing layer.

(6) Recording Sheet 2E

A water-based coating composition was prepared by mixing 125.4 parts (nonvolatile matter 40 parts) of the cationic acrylic copolymer emulsion 2 obtained in the above step (1), 600 parts (nonvolatile matter 60 parts) of a 10 weight % aqueous solution of an acetoacetyl-modified vinyl acetate-series copolymer (Nippon Synthetic Chemical Industry, Co., Ltd., Z-320), and 0.5 part of a curing catalyst (dioctyltin dilaurate). This water-based coating composition was coated on a PET film and dried at 100° C. for 3 minutes to provide a recording sheet 2E having a 15 μm-thick ink absorbing layer.

Example 3

(1) Cationic Acrylic Copolymer Emulsion 3

Except for using, as copolymerization components, 71.6 parts of MMA, 71.6 parts of BA, 49.3 parts of DEAEMA, 49.3 parts of 2-hydroxyethyl methacrylate, and 2.5 parts of "A-174," the procedure of Example 1 was repeated to provide a cationic acrylic copolymer emulsion 3 (nonvolatile matter 26.9%). The surface potential (ζ potential) of the polymer particles of the emulsion was +35 mV, as determined under the conditions mentioned hereinbefore.

(2) Recording Sheet 3A

The cationic acrylic copolymer emulsion 3 obtained in the above step (1) was coated on a PET film and dried at 100° C. for 3 minutes to provide a recording sheet 3A having a 15 μm-thick ink absorbing layer.

(3) Recording Sheet 3B

A water-based coating composition was prepared by mixing 148.7 parts (nonvolatile matter 40 parts) of the cationic acrylic copolymer emulsion 3 obtained in the above step (1) with 600 parts (nonvolatile matter 60 parts) of a 10 weight % aqueous solution of an acetoacetyl-modified vinyl acetate-series copolymer (Nippon Synthetic Chemical Industry, Co., Ltd., Z-320). This water-based coating composition was coated on a PET film and dried at 100° C. for 3 minutes to provide a recording sheet 3B having a 15 μm-thick ink absorbing layer.

(4) Recording Sheet 3C

A water-based coating composition was prepared by mixing 92.9 parts (nonvolatile matter 25 parts) of the cationic acrylic copolymer emulsion 3 obtained in the above step (1) with 500 parts (nonvolatile matter 75 parts) of a 15 weight % aqueous solution of a modified vinyl acetate-series copolymer (Nippon Synthetic Chemical Industry, Co., Ltd., OKS-7158G). This water-based coating composition was coated on a PET film and dried at 100° C. for 3 minutes to provide a recording sheet 3C having a 15 μm-thick ink absorbing layer.

(5) Recording Sheet 3D

A water-based coating composition was prepared by mixing 92.9 parts (nonvolatile matter 25 parts) of the cationic acrylic copolymer emulsion 3 obtained in the above step (1) with 750 parts (nonvolatile matter 75 parts) of a 10 weight % aqueous solution of polyvinylpyrrolidone (weight average molecular weight $36\times10^4$). This water-based coating composition was coated on a PET film and dried at 100° C. for 3 minutes to provide a recording sheet 3D having a 15 μm-thick ink absorbing layer.

Example 4

(1) Cationic Acrylic Copolymer Emulsion 4

Using 59.1 parts of MMA, 59.1 parts of BA, 49.3 parts of DEAEMA, 49.3 parts of PEG-200, 24.7 parts of acrylic acid, and 4.9 parts of "A-174", polymerization was carried out in the same manner as in Example 1.

After completion of the polymerization, the flask was charged with 5.8 parts of 25% aqueous ammonia with stirring, and 705 parts of water was added dropwise over about 2 hours for emulsification. The resulting emulsion was concentrated in the same manner as in Example 1 to provide a cationic acrylic copolymer emulsion 4 (nonvolatile matter 34.0%). The surface potential (ζ potential) of polymer particles of this emulsion was +15 mV, as determined under the conditions mentioned hereinbefore.

(2) Recording Sheet 4A

The cationic acrylic copolymer emulsion 4 obtained in the above step (1) was coated on a PET film and dried at 100° C. for 3 minutes to provide a recording sheet 4A having a 15 μm-thick ink absorbing layer.

(3) Recording Sheet 4B

A water-based coating composition was prepared by mixing 88.2 parts (nonvolatile matter 30 parts) of the cationic acrylic copolymer emulsion 4 obtained in the above step (1) with 700 parts (nonvolatile matter 70 parts) of a 10 weight % aqueous solution of acetoacetyl-modified vinyl acetate-series copolymer (Nippon Synthetic Chemical Industry, Co., Ltd., Z-320). This water-based coating composition was coated on a PET film and dried at 100° C. for 3 minutes to provide a recording sheet 4B having a 15 μm-thick ink absorbing layer.

(4) Recording Sheet 4C

A water-based coating composition was prepared by mixing 88.2 parts (nonvolatile matter 30 parts) of the cationic acrylic copolymer emulsion 4 obtained in the above step (1) with 466.7 parts (nonvolatile matter 70 parts) of a 15 weight % aqueous solution of modified vinyl acetate-series copolymer (Nippon Synthetic Chemical Industry, Co., Ltd., OKS-7158G). This water-based coating composition was coated on a PET film and dried at 100° C. for 3 minutes to provide a recording sheet 4C having a 15 μm-thick ink absorbing layer.

(5) Recording Sheet 4D

A water-based coating composition was prepared by mixing 73.5 parts (nonvolatile matter 25 parts) of the cationic acrylic copolymer emulsion 4 obtained in the above step (1) with 750 parts (nonvolatile matter 75 parts) of a 10 weight % aqueous solution of polyvinylpyrrolidone (weight average molecular weight $36\times10^4$). This water-based coating composition was coated on a PET film and dried at 100° C. for 3 minutes to provide a recording sheet 4D having a 15 μm-thick ink absorbing layer.

Comparative Example 1

(1) Acrylic Copolymer Emulsion 5

A 2,000 ml reactor equipped with a stirrer, a reflux condenser, a drip funnel, a nitrogen gas inlet pipe, and a thermometer was charged with 679 parts of water, followed by addition of 0.75 part of polyoxyethylene nonylphenyl ether and 2.8 parts of alkyl diphenyl ether sulfonate sodium, and the charge was thoroughly dissolved by stirring. Then, 60 parts of MMA and 60 parts of BA were added and the mixture was heated to 50° C. To this mixture was added 0.3 g of potassium persulfate to start polymerization. After 2 hours of reaction, 0.3 g of potassium persulfate was further added and the mixture was reacted for 3 hours to complete the polymerisation, whereby an acrylic copolymer emulsion 5 (nonvolatile matter 16.8%) was obtained. The surface potential (ζ potential) of polymer particles of the emulsion was −18 mV, as determined under the same conditions as above.

(2) Recording Sheet 5A

The acrylic copolymer emulsion 5 obtained in the above step (1) was coated on a PET film and dried at 100° C. for 3 minutes to provide a recording sheet 5A having a 15 μm-thick ink absorbing layer.

(3) Recording Sheet 5B

A water-based coating composition was prepared by mixing 148.8 parts (nonvolatile matter 25 parts) of the acrylic copolymer emulsion 5 obtained in the above step (1) with 750 parts (nonvolatile matter 75 parts) of a 10 weight % aqueous solution of acetoacetyl-modified vinyl acetate-series copolymer (Nippon Synthetic Chemical Industry, Co., Ltd., Z-320). This water-based coating composition was coated on a PET film and dried at 100° C. for 3 minutes to provide a recording sheet 5B having a 15 μm-thick ink absorbing layer.

(4) Recording Sheet 5C

A water-based coating composition was prepared by mixing 148.8 parts (nonvolatile matter 25 parts) of the acrylic copolymer emulsion 5 obtained in the above step (1) with 500 parts (nonvolatile matter 75 parts) of a 15 weight % aqueous solution of modified vinyl acetate-series copolymer (Nippon Synthetic Chemical Industry, Co., Ltd., OKS-7158G). This water-based coating composition was coated on a PET film and dried at 100° C. for 3 minutes to provide a recording sheet 5C having a 15 μm-thick ink absorbing layer.

(5) Recording Sheet 5D

A water-based coating composition was prepared by mixing 148.8 parts (nonvolatile matter 25 parts) of the acrylic copolymer emulsion 5 obtained in the above step (1) with 750 parts (nonvolatile matter 75 parts) of a 10 weight % aqueous solution of polyvinylpyrrolidone (weight average molecular weight $36\times10^4$). This water-based coating composition was coated on a PET film and dried at 100° C. for 3 minutes to provide a recording sheet 5D having a 15 μm-thick ink absorbing layer.

Comparative Example 2

A 15 weight % aqueous solution of modified vinyl acetate-series copolymer (Nippon Synthetic Chemical Industry, Co., Ltd., OKS-7158G) was coated on a PET film and dried at 100° C. for 3 minutes to provide a recording sheet 6 having a 15 μm-thick ink absorbing layer.

Comparative Example 3

A 10 weight % aqueous solution of acetoacetyl-modified vinyl acetate-series copolymer (Nippon Synthetic Chemical Industry, Co., Ltd., Z-320) was coated on a PET film and dried at 100° C. for 3 minutes to provide a recording sheet 7 having a 15 μμm-thick ink absorbing layer.

Comparative Example 4

A 10 weight % aqueous solution of polyvinylpyrrolidone (weight average molecular weight $36\times10^4$) was coated on a PET film and dried at 100° C. for 3 minutes to provide a recording sheet 8 having a 15μm-thick ink absorbing layer.

The results of evaluation of the recording sheets obtained in the above examples and comparative examples are presented in Table 1.

TABLE 1

| Recording sheet | Ink absorption | Water resistance | Print Quality | Water immersion test | Color density retention |
|---|---|---|---|---|---|
| Example 1 | | | | | |
| 1A | 3 mins. | ○ | ○ | ○ | 97% |
| 1B | 3 mins. | Δ | ○ | Δ | 93% |
| 1C | 4 mins. | Δ | Δ | Δ | 92% |
| 1D | 3 mins. | ○ | ○ | ○ | 95% |
| 1E | 4 mins. | ○ | ○ | ○ | 100% |
| Example 2 | | | | | |
| 2A | 5 mins. | ○ | Δ | ○ | 95% |
| 2B | 2 mins. | ○ | ○ | ○ | 90% |
| 2C | 2 mins. | Δ | ○ | Δ | 92% |
| 2D | 3 mins. | Δ | Δ | Δ | 88% |
| 2E | 3 mins. | ○ | ○ | ○ | 94% |
| Example 3 | | | | | |
| 3A | 5 mins. | ○ | Δ | ○ | 95% |
| 3B | 2 mins. | ○ | ○ | ○ | 92% |
| 3C | 2 mins. | Δ | ○ | Δ | 87% |
| 3D | 3 mins. | Δ | Δ | Δ | 85% |
| Example 4 | | | | | |
| 4A | 5 mins. | ○ | Δ | ○ | 92% |
| 4B | 2 mins. | ○ | ○ | ○ | 88% |
| 4C | 2 mins. | Δ | ○ | Δ | 85% |
| 4D | 3 mins. | Δ | Δ | Δ | 85% |
| Comp.Ex. 1 | | | | | |
| 5A | ≧7 mins. | X | X | X | 30% |
| 5B | 5 mins. | X | Δ | X | 23% |
| 5C | 5 mins. | X | Δ | X | 25% |
| 5D | 6 mins. | X | X | X | 18% |
| Comp.Ex. 2 | | | | | |
| 6 | 2 mins. | X | ○ | X | 25% |
| Comp.Ex. 3 | | | | | |
| 7 | 2 mins. | X | ○ | X | 28% |
| Comp.Ex. 4 | | | | | |
| 8 | 3 mins. | X | Δ | X | 20% |

It is apparent from this table that the recording sheets obtained in the examples are invariably superior to the sheets obtained in the comparative examples in water resistance and ink absorption.

What is claimed is:

1. A recording sheet comprising a substrate and an ink absorbing layer formed on at least one side of the substrate, wherein said ink absorbing layer is composed of a cationic polymer having crosslinking groups, said cationic polymer being a cationic copolymer of a cationic monomer, selected from the group consisting of a cationic monomer having a tertiary amino group and a cationic monomer having a quaternary ammonium group, with a crosslinking monomer having an alkoxysilyl group and a hydrophilic polymer, wherein said cationic polymer comprises an aqueous cationic polymer emulsion having tertiary amine salt groups or quaternary ammonium salt groups and a surface potential (ζ potential) of 10 to 60 mV, and wherein said cationic polymer is obtained without secondary amines for cationization of an epoxy group or cationizing agents for cationization of a hydroxy group.

2. The recording sheet according to claim 1, wherein the cationic polymer comprises an acrylic polymer emulsion.

3. The recording sheet according to claim 1, wherein the monomers forming the cationic polymer comprise either:

(1) cationic monomers and crosslinking monomers; or (2) cationic monomers, crosslinking monomers, and hydrophilic monomers.

4. The recording sheet according to claim 3, wherein the hydrophilic monomer is a (meth)acrylic acid ester having a polyoxyalkylene unit.

5. The recording sheet according to claim 1, wherein the cationic polymer is bonded to or crosslinked with the hydrophilic polymer.

6. The recording sheet according to claim 1, wherein the cationic polymer and the hydrophilic polymer have mutually reactive functional groups.

7. The recording sheet according to claim 1, wherein the cationic polymer is a copolymer of a monomer comprising 0.1 to 50 mole % of the cationic monomer and 0.1 to 25 mole % of the crosslinking monomer.

8. The recording sheet according to claim 1, wherein the weight average molecular weight of the cationic polymer is $0.2\times10^4$ to $100\times10^4$.

9. The recording sheet according to claim 1, wherein the glass transition temperature of the cationic polymer is −20° C. to 50° C.

10. The recording sheet according to claim 1, wherein the hydrophilic polymer is at least one member selected from the group consisting of cellulose derivatives, vinyl alcohol-series polymers, vinyl ester-series polymers, and polyvinylpyrrolidone.

11. The recording sheet according to claim 1, wherein the hydrophilic polymer is a polymer having at least one functional group selected from the group consisting of a polyoxyalkylene unit, an acetoacetyl group, a carboxyl group, an acid anhydride group, and an amino group.

12. The recording sheet according to claim 1, wherein the ratio of the cationic polymer to the hydrophilic polymer is 5/95 to 95/5 (former/latter, weight %) on a nonvolatile matter basis.

13. The recording sheet according to claim 1, wherein the ink absorbing layer further contains a curing agent.

14. The recording sheet according to claim 1, wherein the ink absorbing layer further contains a dye fixative.

15. The recording sheet according to claim 1 which has a color density retention rate of not less than 80% as determined by immersing the print, formed by the ink jet recording system using a water-based ink, in water at a temperature of 30° C. for one minute.

* * * * *